(12) United States Patent
Miki et al.

(10) Patent No.: US 6,673,490 B2
(45) Date of Patent: Jan. 6, 2004

(54) NICKEL-HYDROGEN STORAGE BATTERY AND METHOD OF PRODUCING THE SAME

(75) Inventors: Koji Miki, Sumoto (JP); Tadashi Ise, Matsushige (JP); Masao Takee, Matsushige (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 10/246,545

(22) Filed: Sep. 19, 2002

(65) Prior Publication Data

US 2003/0017395 A1 Jan. 23, 2003

Related U.S. Application Data

(62) Division of application No. 09/543,558, filed on Apr. 5, 2000, now abandoned.

(30) Foreign Application Priority Data

Apr. 7, 1999 (JP) ........................................ P. 11-100283

(51) Int. Cl.⁷ .................................................. H01M 4/32
(52) U.S. Cl. ...................................................... 429/223
(58) Field of Search ............................... 429/223, 218.2, 429/206; 423/594, 641

(56) References Cited

U.S. PATENT DOCUMENTS

| | | | |
|---|---|---|---|
| 4,935,318 A | * | 6/1990 | Ikoma et al. ............... 429/206 |
| 4,985,318 A | * | 1/1991 | Oshitani et al. ............ 429/223 |
| 5,707,764 A | | 1/1998 | Miyamoto et al. |
| 5,708,349 A | | 1/1998 | Hasebe et al. |
| 5,795,558 A | | 8/1998 | Aoki et al. |
| 5,798,189 A | | 8/1998 | Hayashida et al. |
| 5,804,334 A | | 9/1998 | Yamamura et al. |
| 6,027,834 A | | 2/2000 | Hayashi et al. |
| 6,130,006 A | | 10/2000 | Kohno et al. |
| 6,156,455 A | | 12/2000 | Yamamura et al. |
| 6,242,134 B1 | | 6/2001 | Fujiwara et al. |
| 6,248,475 B1 | | 6/2001 | Hayashida et al. |

FOREIGN PATENT DOCUMENTS

| | | |
|---|---|---|
| JP | 5-28992 | 2/1993 |
| JP | 11-73957 | 3/1999 |

* cited by examiner

*Primary Examiner*—Tom Dunn
*Assistant Examiner*—Jonathan Johnson
(74) *Attorney, Agent, or Firm*—Nixon & Vanderhye P.C.

(57) ABSTRACT

A nickel-hydrogen storage battery having improved charge and discharge cycle characteristics even in high temperature, which has a negative electrode comprising a hydrogen absorbing alloy capable of electrochemically storing and releasing hydrogen, a positive electrode comprising nickel hydroxide as a main active material, and an alkaline electrolytic solution mainly comprising an aqueous potassium hydroxide solution, wherein the positive electrode contains a cobalt compound, a yttrium compound, and 100 ppm or more of lithium based on the total weight of the nickel hydroxide, the cobalt compound, and the yttrium compound.

5 Claims, 1 Drawing Sheet

NICKEL-HYDROGEN STORAGE BATTERY AND METHOD OF PRODUCING THE SAME

This application is a division Ser. of application No. 09/543,558, filed Apr. 5, 2000 now abandoned, the entire content of which is hereby incorporated by reference in this application.

BACKGROUND OF THE INVENTION

1. Field of the Invention

This invention relates to a nickel-hydrogen storage battery with improved high-temperature performance and a process for producing the same.

2. Description of the Related Art

The recent development in electronics has promoted reduction in size and weight of electronic equipment, and the demand for storage batteries as a power source of the electronic equipment has been increasing. Accordingly, the storage batteries have been required to have higher capacities and longer lives.

In recent years, nickel-hydrogen storage batteries comprising a metal compound such as nickel hydroxide as a positive electrode and a hydrogen absorbing alloy as a negative electrode have been attracting attention as alkali storage batteries taking the place of nickel-cadmium storage batteries. The nickel-hydrogen storage batteries are characterized by the higher energy density than the nickel-cadmium storage batteries and their environment friendliness because cadmium is not used as a negative electrode.

JP-A-5-28992 proposes a nickel-hydrogen storage battery in which nickel is used as a positive electrode that is highly utilizable as an active material over a wide temperature range.

According to the disclosure, the utilization of the active material in high temperature is improved without impairing the utilization in room temperature by adding to the active material mainly comprising nickel oxide at least one compound of yttrium, indium, antimony, barium or beryllium. JP-A-5-28992 also describes addition of a cobalt compound to the nickel positive electrode and addition of potassium hydroxide and 10 g/l or more of lithium hydroxide to the electrolytic solution.

According to the present inventors' study, however, it has turned out that nickel-hydrogen batteries having the conventional positive electrode undergo considerable reduction in capacity on repetition of charge and discharge cycles in high temperature. Addition of the conventional additives, such as the yttrium compound, to the active material and addition of lithium hydroxide to the electrolytic solution are still insufficient to produce effects in suppressing capacity reduction in high temperature.

SUMMARY OF THE INVENTION

Figure 1:
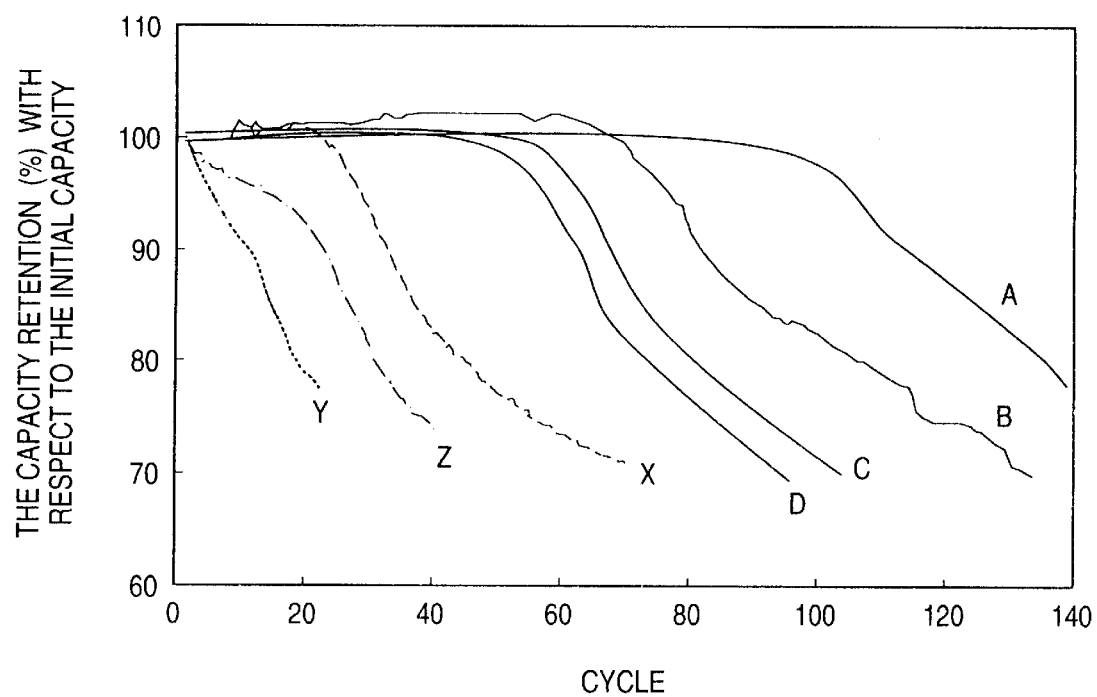
FIG. 1 is a graph showing the charge and discharge characteristics of the batteries tested.

An object of the invention is to provide a nickel-hydrogen storage battery which is sufficiently prevented from reducing the discharge capacity even on repetition of charge and discharge cycles in high temperature and a process for producing the nickel-hydrogen storage battery.

The present invention provides a nickel-hydrogen storage battery having a negative electrode comprising a hydrogen absorbing alloy capable of electrochemically storing and releasing hydrogen, a positive electrode comprising nickel hydroxide as a main active material, and an alkaline electrolytic solution mainly comprising an aqueous potassium hydroxide solution, wherein the positive electrode active material contains a cobalt compound, a yttrium compound, and 100 ppm or more of lithium based on the total weight of the nickel hydroxide, the cobalt compound, and the yttrium compound.

The nickel-hydrogen storage battery of the invention exhibits excellent cycle characteristics even in high temperature and therefore possesses high industrial value.

DESCRIPTION OF THE PREFERRED EMBODIMENT

Since the nickel hydroxide active material contains a cobalt compound, a yttrium compound, and 100 ppm or more of lithium, the reduction in capacity on repetition of charge and discharge cycles in high temperature can be suppressed sufficiently. Where charge and discharge cycles are repeated in high temperature, a cobalt compound added to the positive electrode generally diffuses into the inside of the nickel hydroxide active material, and, as a result, the electrically conducting matrix of cobalt that has been formed on the surface of the active material disappears. In the present invention, it seems that yttrium and lithium exert interaction to inhibit cobalt from diffusing. Although the mechanism of such interaction is unclear, the fact is that sufficient effects are not obtained with either yttrium or lithium used alone. Further, the effects are influenced by the lithium content in the positive electrode. It is required for lithium to be present in an amount of 100 ppm or more, preferably 150 ppm or more, based on the total weight of the nickel hydroxide, the cobalt compound, and the yttrium compound.

The nickel-hydrogen storage battery according to the invention can preferably be produced by a process comprising adding a cobalt compound and a yttrium compound to a positive electrode active material mainly comprising nickel hydroxide, adding lithium hydroxide to an alkaline electrolytic solution mainly comprising an aqueous potassium hydroxide solution, and activating the assembled nickel-hydrogen storage battery in such a manner that the battery voltage at the end of the first discharge may be 1.15 V or higher.

In the above-described process, although lithium is not previously present in the positive electrode, it has been confirmed that 100 ppm or more of lithium is taken into the positive electrode, especially into the crystals of nickel hydroxide by an activation treatment under specific conditions (conditions under which a battery voltage of 1.15 V or more may be maintained at the end of the first discharge).

In this invention, "lithium is taken into the positive electrode" shows a state having a crystal structure of $Ni(OLi_xH_{1-x})_y LiOH$ by replacing H in $Ni(OH)_y LiOH$ as a positive electrode active material with Li, or a state that Li is interposed between crystal layers.

Preferably an amount of Li in electrolyte is 10 g/l–30 g/l. If the amount of Li in electrolyte is too much, Li is segregate on a surface of the crystal and it is difficult for Li ion to invade into the crystal.

Further the present invention is applicable to a case that Li is included only in an active material without including Li in electrolyte, too.

The present invention will now be illustrated in greater detail by way of Examples, but it should be understood that the invention is not construed as being limited thereto. Unless otherwise noted, all the percents are given by weight.

EXAMPLE 1

Preparation of Positive Electrode

Nickel hydroxide powder was poured into an aqueous solution of cobalt sulfate powder. An aqueous solution of sodium hydroxide was added thereto dropwise while stirring to adjust the pH of the system, followed by stirring.

The precipitate thus formed was collected by filtration, washed with water, and dried in vacuo at room temperature (about 25° C.) to obtain cobalt hydroxide-coated nickel hydroxide particles.

The resulting particles were mixed with an aqueous sodium hydroxide solution, heat-treated in air, washed with water, and dried to prepare an active material powder comprising nickel hydroxide particles having a sodium-containing cobalt compound coat. Yttrium oxide and a methyl cellulose aqueous solution (binder) were mixed into the active material powder into paste, to which 3 mg of lithium hydroxide was added per gram of the active material.

The lithium hydroxide-containing active material paste was applied into the pores of blowing nickel, dried, and compressed to prepare an unburnt nickel electrode.

Preparation of Hydrogen Absorbing Alloy

Mm (a mixture of rare earth elements), Ni, Co, Al, and Mn (purity of Ni, Co, Al, and Mn: 99.9%) were mixed at a molar ratio of 1.0:3.1:0.8:0.4:0.7. The mixture was melted in an arc electric furnace in an argon atmosphere and allowed to cool spontaneously to obtain a hydrogen absorbing alloy represented by compositional formula: $MmNi_{3.1}Co_{0.8}Al_{0.4}Mn_{0.7}$. The resulting ingot was heated at 800° C. for 6 hours, allowed to cool, and ground in an inert atmosphere to an average particle size of about 65 µm.

Preparation of Negative Electrode

The hydrogen absorbing alloy powder prepared above was mixed with 20% of a 5% aqueous solution of polyethylene oxide to prepare an active material paste. The paste was applied to both sides of a nickel-plated punching metal core, dried at room temperature, and cut to size to obtain a negative electrode comprising the hydrogen absorbing alloy.

Preparation of Nickel-hydrogen Storage Battery

The positive electrode and the negative electrode prepared above were combined with alkali-resistant nonwoven fabric interposed therebetween as a separator, and impregnated with a 6.8N alkaline electrolytic solution comprising a 30% aqueous solution of potassium hydroxide to which 20 g/l of lithium hydroxide had been added to prepare a size-AA nickel-hydrogen storage battery having a nominal capacity of 1000 mAh.

The resulting nickel-hydrogen storage battery was subjected to activation under the following charge and discharge conditions (1) to obtain a nickel-hydrogen storage battery according to the invention (designated battery A).

Charge and Discharge Conditions (1)

Charge: 0.1C×60 min→0.5C×108 min (25° C.)

Rest: 3 hrs (65° C.)

Discharge: 0.2C×228 min (65° C.)

Rest: 24 hrs (65° C.)

The cut-off voltage in the discharge was 1.15 V.

It was confirmed by atomic-absorption spectroscopy that the lithium content in the positive electrode after the activation was 150 ppm. It is considered that most of the added lithium hydroxide had stayed on the surface of the active material without being taken into the crystals of the active material and, on contact with the electrolytic solution, drifted away and that the above measured concentration of lithium corresponds to the part of the lithium hydroxide remaining in the crystals of the positive electrode active material.

EXAMPLE 2

A nickel positive electrode was prepared in the same manner as in Example 1, except that a lithium hydroxide aqueous solution was not added to the active material mixture. A size-AA nickel-hydrogen storage battery having a nominal capacity of 1000 mAh was assembled in the same manner as in Example 1, except for using the above prepared positive electrode and a 6.8N alkaline electrolytic solution comprising a 30% aqueous solution of potassium hydroxide to which 32 g/l of lithium hydroxide had been added.

The resulting nickel-hydrogen storage battery was subjected to activation under the same conditions as in Example 1 to obtain a nickel-hydrogen storage battery according to the invention (designated battery B).

Although lithium had not been added to the positive electrode active material, atomic-absorption spectroscopy revealed that the nickel hydroxide crystals of the positive electrode had a lithium content of 100 ppm after the activation.

EXAMPLE 3

A nickel positive electrode was prepared in the same manner as in Example 1, except that a lithium hydroxide aqueous solution was not added to the active material mixture. A size-AA nickel-hydrogen storage battery having a nominal capacity of 1000 mAh was assembled in the same manner as in Example 1, except for using the above prepared positive electrode and a 6.8N alkaline electrolytic solution comprising a 30% aqueous solution of potassium hydroxide to which 15 g/l of lithium hydroxide had been added.

The resulting nickel-hydrogen storage battery was subjected to activation under the same conditions as in Example 1 to obtain a nickel-hydrogen storage battery according to the invention (designated battery C).

Although lithium had not been added to the positive electrode active material, atomic-absorption spectroscopy revealed that the nickel hydroxide crystals of the positive electrode had a lithium content of 100 ppm after activation.

EXAMPLE 4

A nickel positive electrode was prepared in the same manner as in Example 1, except that a lithium hydroxide aqueous solution was not added to the active material paste. A size-AA nickel-hydrogen storage battery having a nominal capacity of 1000 mAh was assembled in the same manner as in Example 1, except for using the above prepared positive electrode and a 7.0N alkaline electrolytic solution comprising a 30% aqueous solution of potassium hydroxide to which 20 g/l of lithium hydroxide had been added.

The resulting nickel-hydrogen storage battery was subjected to activation under the same conditions as in Example 1 to obtain a nickel-hydrogen storage battery of the present invention (designated battery D).

Although lithium had not been added to the positive electrode active material, atomic-absorption spectroscopy revealed that the nickel hydroxide crystals of the positive electrode had a lithium content of 100 ppm after activation.

Comparative Example 1

A nickel positive electrode was prepared in the same manner as in Example 1, except that a lithium hydroxide aqueous solution was not added to the active material mixture. A size-AA nickel-hydrogen storage battery having a nominal capacity of 1000 mAh was assembled in the same manner as in Example 1, except for using the above prepared positive electrode and a 6.8N alkaline electrolytic solution comprising a 30% aqueous solution of potassium hydroxide to which 32 g/l of lithium hydroxide had been added.

The resulting nickel-hydrogen storage battery was subjected to activation under the following charge and discharge conditions (2) to obtain a comparative nickel-hydrogen storage battery (designated battery X).

Discharge Conditions (2)

Charge: 0.1C×60 min→0.75C×64 min (25° C.)

Rest: 3 hrs (65° C.)

Discharge: 0.2C×228 min (65° C.)

Rest: 24 hrs (65° C.)

The cut-off voltage after the discharge was 1.10 V.

The lithium content in the positive electrode after activation was found to be 50 ppm by atomic-absorption spectroscopy.

Comparative Example 2

A nickel positive electrode was prepared in the same manner as in Example 1, except that yttrium oxide and lithium hydroxide aqueous solution were not added to the active material mixture. A size-AA nickel-hydrogen storage battery having a nominal capacity of 1000 mAh was assembled in the same manner as in Example 1, except for using the above prepared positive electrode and a 6.8N alkaline electrolytic solution comprising a 30% aqueous solution of potassium hydroxide to which 32 g/l of lithium hydroxide had been added.

The resulting nickel-hydrogen storage battery was subjected to activation under the same conditions as in Example 1 to obtain a comparative nickel-hydrogen storage battery (designated battery Y). The lithium content in the positive electrode was found to be 100 ppm by atomic-absorption spectroscopy.

Comparative Example 3

A nickel-hydrogen storage battery was prepared in the same manner as in Example 1, except that yttrium oxide was not added to the active material mixture. The lithium content in the positive electrode was found to be 150 ppm by atomic-absorption spectroscopy.

Evaluation

The nickel-hydrogen storage batteries A to D according to the invention and the comparative batteries X to Z were subjected to a charge and discharge cycle test as follows.

The battery was charged at 0.6C. The charge was stopped when a voltage drop from a full charge ΔV was 10 mV. After 1 hour's rest, the battery was discharged at 0.6C, and the capacity obtained up to a cut-off voltage of 1 V was measured. After one hour for rest, the battery was subjected to the next charge and discharge cycle. The test was carried out in a surrounding temperature of 50° C. The capacity retention (%) with respect to the initial capacity was obtained for each cycle. The results are graphically represented in FIG. 1.

As is clearly seen from FIG. 1, reduction in discharge capacity with charges and discharges is significantly suppressed in the nickel-hydrogen storage batteries A to D according to the present invention as compared with the comparative batteries X to Z. That is, the batteries of the invention have excellent charge and discharge characteristics in high temperature.

The positive electrode of batteries A to D contains 100 to 150 ppm of lithium, whereas that of battery X has lithium content of 50 ppm. It is understood from this comparison that the positive electrode is required to have lithium content of 100 ppm or higher after activation (after at least one charge and one discharge).

Battery A has the highest lithium content because lithium had been added to the positive electrode active material mixture beforehand. To the contrary, the positive electrode active material mixtures used in batteries B to D contain no lithium. Nevertheless, it is possible to make the positive electrode have a lithium content of 100 ppm or higher by adding 15 g/l or more of lithium hydroxide to the electrolytic solution and activating the battery under such conditions that the battery may retain a voltage of 1.15 V or higher after a discharge according to the process of the invention.

It is seen that batteries B to D containing an yttrium compound in the positive electrode are superior in charge and discharge cycle characteristics to batteries Y and Z having no yttrium compound in the positive electrode. The necessity of the existence of an yttrium compound in addition to the existence of 100 ppm or more of lithium in the positive electrode is thus proved.

In general, a cobalt compound added to the nickel hydroxide positive electrode diffuses into the nickel hydroxide crystals on repetition of charges and discharges particularly in high temperature, resulting in disappearance of the conductive matrix of cobalt. In the present invention, to the contrary, the yttrium compound and lithium added to the positive electrode active material seem to exert interaction to suppress the diffusion of the cobalt into the inside of nickel hydroxide even in high temperature and to prevent disappearance of the conductive matrix of cobalt.

While in the foregoing Examples the conditions of the activation treatment were selected by altering the charging conditions so that the battery voltage after the discharge might be 1.15 V or higher, the activation conditions can be adjusted by alteration of the discharging conditions or both the charging and discharging conditions so that the battery voltage after the discharge might be 1.15 V or higher.

While the invention has been described in detail and with reference to specific examples thereof, it will be apparent to one skilled in the art that various changes and modifications can be made therein without departing from the spirit and scope thereof.

What is claimed is:

1. A method of producing a nickel-hydrogen storage battery comprising the steps of:

forming a negative electrode comprising a hydrogen absorbing alloy capable of electrochemically storing and releasing hydrogen, as a negative electrode active material;

forming a positive electrode comprising nickel hydroxide as a main active material in which a cobalt compound and a yttrium compound are previously added and mounting the negative electrode and the positive electrode with an alkaline electrolytic solution mainly comprising an aqueous potassium hydroxide solution in which lithium hydroxide is added, to form the battery; and activating the battery by carrying out charging and discharging in such a manner that the battery voltage at the end of the discharge may be 1.15 V or higher for the first time.

2. A method of producing a nickel-hydrogen storage battery according to claim 1, wherein lithium hydroxide is added in an amount of 15 g or more per liter of said electrolytic solution.

3. A method of producing a nickel-hydrogen storage battery according to claim 1, wherein the step of forming a positive electrode comprises the steps of:

preparing an active material paste comprising an active material powder made of nickel hydroxide particles, whose surface is covered with a sodium-containing cobalt compound, Yttrium oxide and a lithium hydroxide; and pressing to form it.

4. A method of producing a nickel-hydrogen storage battery according to claim 1, wherein the step of forming a negative electrode comprises the steps of:

preparing an active material paste comprising a hydrogen absorbing alloy represented by compositional formula: $MmNi_{3.1}Co_{0.8}Al_{0.4}Mn_{0.7}$; and pressing to form it.

5. A method of producing a nickel-hydrogen storage battery according to claim 1, wherein the lithium is determined so that yttrium and lithium exert interaction to inhibit cobalt from diffusing so as to remain a conductive matrix of cobalt on a surface of the active material.

* * * * *